(12) United States Patent
Hillberry et al.

(10) Patent No.: US 7,621,705 B2
(45) Date of Patent: Nov. 24, 2009

(54) VIBRATION REDUCTION SUPPORT APPARATUS

(76) Inventors: Dee J. Hillberry, P.O. Box 210, Thermopolis, WY (US) 82443; Mark C. Mortimore, 624 Arapahoe, Thermopolis, WY (US) 82443

( * ) Notice: Subject to any disclaimer, the term of this patent is extended or adjusted under 35 U.S.C. 154(b) by 0 days.

(21) Appl. No.: 11/109,517

(22) Filed: Apr. 19, 2005

(65) Prior Publication Data
US 2005/0177948 A1 Aug. 18, 2005

Related U.S. Application Data

(63) Continuation-in-part of application No. 10/607,113, filed on Jun. 25, 2003, now Pat. No. 6,890,137.

(51) Int. Cl.
*B60P 7/08* (2006.01)
(52) U.S. Cl. .............. 410/30; 410/7; 410/19; 410/66; 410/86; 410/87; 296/20; 267/259

(58) Field of Classification Search ............ 410/7, 410/16, 19, 30, 66–67, 77, 80, 86–88, 90; 296/19, 20; 267/33, 150, 259; 188/32; 5/104, 5/118, 210; 248/346.04, 346.11
See application file for complete search history.

(56) References Cited

U.S. PATENT DOCUMENTS

| 2,537,664 A | * | 1/1951 | Golding | |
| 6,890,137 B2 | * | 5/2005 | Hillberry et al. | ............ 410/30 |

* cited by examiner

*Primary Examiner*—Stephen Gordon
(74) *Attorney, Agent, or Firm*—John S. Reid (57) ABSTRACT

Representative embodiments include a support apparatus that can be positioned between a load element and a support element to cushion the load element against vibration with respect to the support element. A receiving member and a base member are movably engaged along an axis of movement. An element engaging surface is defined on one of the members and is configured to releasably engage one of the elements. A vibration reduction device mounted between the members and configured to yieldably resist relative movement of the members toward one another.

6 Claims, 9 Drawing Sheets

VIBRATION REDUCTION SUPPORT APPARATUS

CROSS REFERENCE TO RELATED APPLICATIONS

This application is a Continuation-In-Part of then parent U.S. patent application Ser. No. 10/607,113, filed on Jun. 25, 2003 (now U.S. Pat. No. 6,890,137, issued May 10, 2005) by the inventors named in this application. Priority is hereby claimed under 35 USC 120.

BACKGROUND

Fragile loads require care in loading and transport. By way of example, patient transport by ambulance can result in shock or vibration induced trauma due to road conditions encountered by the ambulance when in transit. Other similar fragile loads, such as wheelchair bound individuals, or sensitive cargo can also require care in transport. However, a transport vehicle suspension has yet to be developed that is sufficiently compliant for fragile loads, and that also provides for safe vehicle operation.

Various suspension devices have been developed in recognition of the above problem. However most are costly, complex, and do not adapt well to standardized load support and securing arrangements by which the otherwise movable load is secured to the adjacent support. One example of such a securing arrangement is the standard ambulance lock down apparatus.

Another problem faced by those wishing supplemental suspension systems in ambulances is that there is generally no standard configuration for ambulance stretchers. In fact, there are several stretcher configurations currently available in the marketplace. Stretcher configuration and weight may vary, as may lock down arrangements. The same can be true for wheelchairs and other forms of cargo such as pallets, shipping containers, and other storage devices. Similar problems can also exist with other forms of support, especially where shock loading is to be avoided.

In ambulances, one fairly standard feature is a floor construction that includes a covering placed over a plywood sub floor. The plywood is placed over a metal pan that is an integral part of, or is mounted to, the ambulance chassis. The pan protects and seals the plywood from exposure to the outside environment and the plywood provides rigidity, working with the floor covering to provide a degree of sound and heat insulation for the ambulance interior. The combination of covering and plywood presents a floor thickness between the covering and pan that is typically less than about one inch. The thin floor structure limits use of sub floor mounted vibration reduction mechanisms, at least if it is desired to maintain the integrity of the pan. Floor mounted vibration reduction systems have been mounted above the floor surfaces to maintain the integrity of the pan. However, such structures can obstruct access and hinder cleaning.

In view of the above problems, what is needed is a vibration reduction arrangement that achieves the benefits to be derived from other, known methods and devices, but which avoids the shortcomings and detriments individually associated therewith.

SUMMARY

The present disclosure provides for any number of different embodiments of a cushioning support apparatus between a load element and a support element. The load and support elements can vary, but generally can involve some form of vehicle as a support element that will transmit vibration to a load element as the vehicle moves across the medium traveled upon.

Ambulances, trucks, vans, and other ground engaging form of vehicle are examples of support elements. Airplanes, helicopters and other aircraft are also examples. Ships, boats, barges and other watercraft are still further examples of vehicles that can be utilized as, or incorporate support elements.

The load element can be any form of mass that can be confined in a physical state to be carried by the vehicle support element. Examples of load elements include but are not limited to ambulance stretchers, wheel chairs, cargo bins, boxes and pallets.

Embodiments of the present invention are provided to reduce transmission of vibration between the support element and a load element carried on the support element. The present support apparatus can be mounted on the support element to removably receive the load element. Alternatively, embodiments of the present apparatus can be mounted to the load element and be removably received on the support element. Still further embodiments of the present invention can also be removably positioned between support and load elements without being mounted to either.

It is also pointed out that the various embodiments of the invention can be used singularly or in groups between a support and a load element. For example, to reduce vibration between an ambulance floor and a stretcher carried by the ambulance, one of the present support apparatus can be provided on the ambulance floor for each leg of the stretcher. In another example, two of the present support apparatus can be arranged on a vehicle floor or other support element to receive the rear weight bearing wheels of a wheel chair. In yet further examples, one or more of the present supports can be arranged between the bottom surface of a load such as a pallet, cargo bin, or other mass; and a support element such as the floor of a transport vehicle.

One embodiment of the present invention provides a support apparatus that can be positioned between a load element and a support element to cushion the load element against vibration with respect to the support element. As such, this embodiment includes a receiving member, and a base member movably mounting the receiving member along an axis of movement. An element engaging surface is defined on one of the members and in substantially normal relation to the axis and is configured to releasably engage one of the elements. One of the members is partially received within the other member for sliding motion along the axis. A vibration reduction device is mounted between the members and is configured to yieldably resist relative movement of the members toward one another.

Another embodiment provides a wheel chair wheel support apparatus for a vehicle having a floor with a top floor surface, and in which an elongated wheel chair wheel receiving member is provided with an elongated concave wheel chair wheel receiving surface that is adapted to releasably receive a wheel chair wheel. An elongated base is also provided and is configured to be mounted to the vehicle floor, to mount the wheel chair receiving member for movement between a position substantially coplanar with the top floor surface, and a position below the top floor surface. A vibration reduction device is mounted between the base and the wheel chair wheel receiving member. A wheel chair wheel can be releasably supported on the wheel chair wheel receiving member and the vibration reduction device will reduce transfer of vibration from the vehicle floor to the wheel chair.

A still further embodiment includes a support apparatus for reducing vibration between a support element and a load element in which a receiving member defining a concave element receiving surface is adapted to releasably receive at least a portion of one of the support or load elements. A base member is also included, to mount the element receiving member for movement between a first position and a second position. A vibration reduction device is mounted between the base member and the receiving member and is configured to reduce transfer of vibration to the load element from the support element.

These and other aspects and embodiments will now be described in detail with reference to the accompanying drawings, wherein:

DETAILED DESCRIPTION

Figure 1:
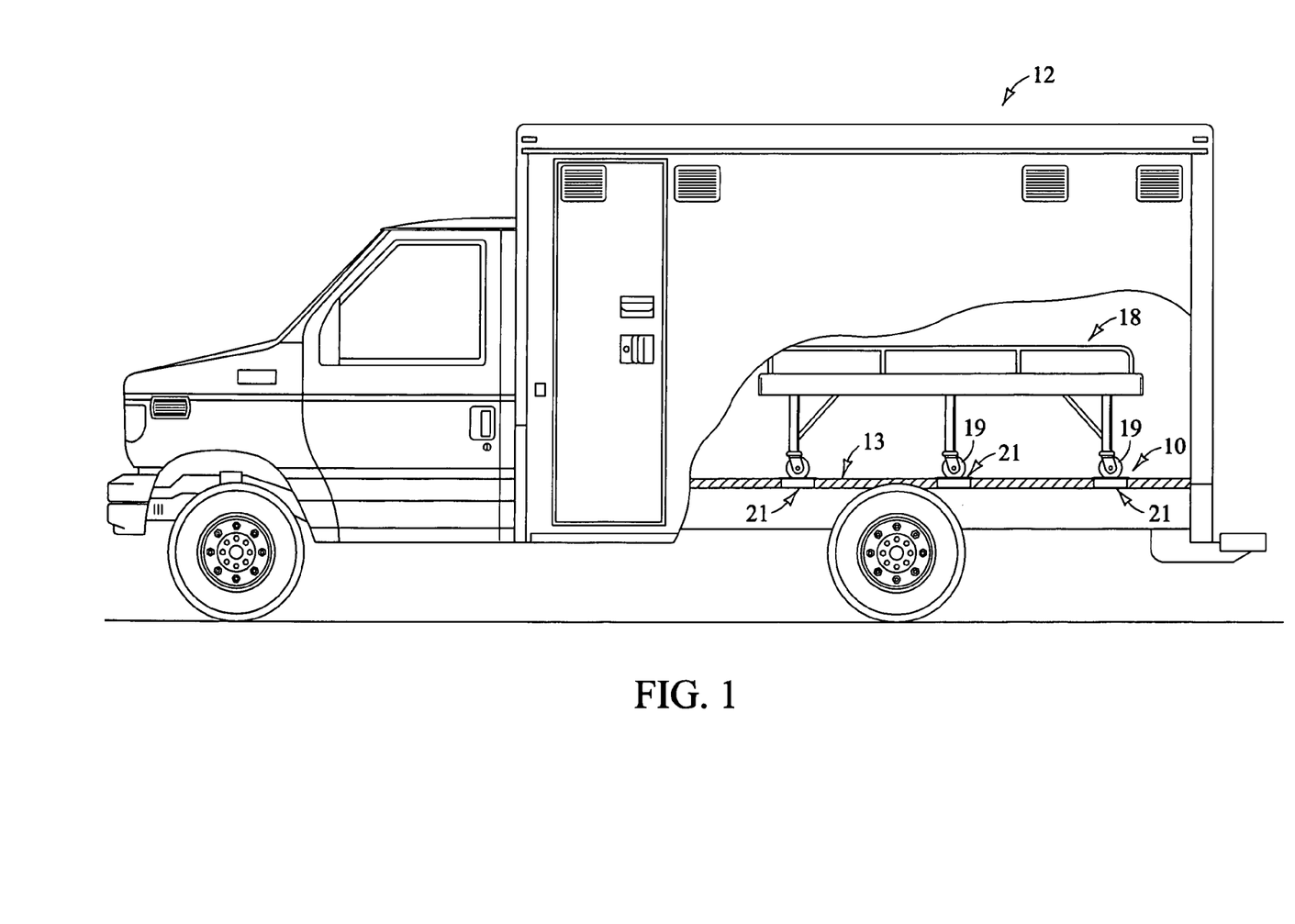
FIG. 1 is a side elevation view of an ambulance incorporating one form of the present support apparatus in accordance with the present invention.

Referring now in greater detail to the drawings, attention is first directed to the ambulance depicted generally in FIG. 1 which defines an exemplary support element 12. The illustrated ambulance is exemplary of numerous forms of support elements 12 that can be used in conjunction with embodiments of the present support apparatus, which are generally depicted in the drawings by reference numeral 10. In the ambulance example, a side wall is shown broken away to expose a portion of a floor 13 which incorporates multiple units of the present support apparatus 10. A stretcher load member 18 is shown resting on a plurality of the support apparatus 10 that are supported in turn by the ambulance support element 12. The stretcher exemplifies a load element 18, with leg and wheel assemblies 19 resting on the support apparatus 10.

Figure 7:
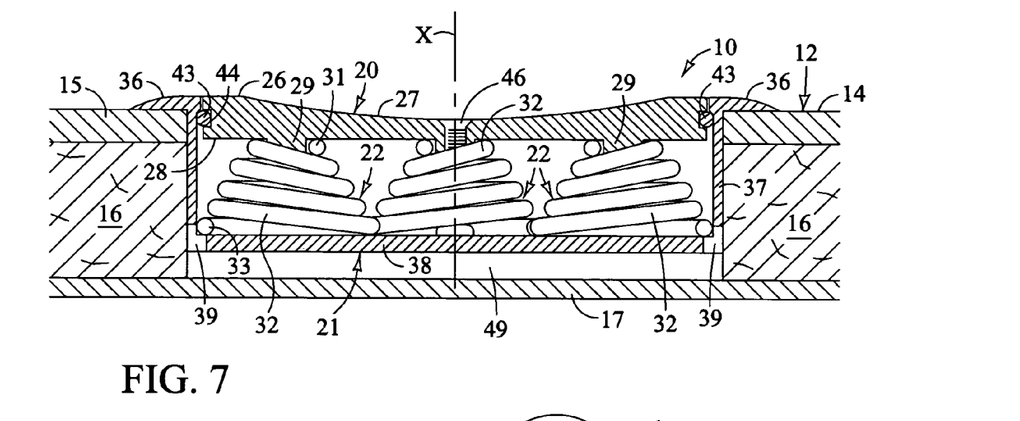
FIG. 7 is a partial sectional view taken through an exemplary base, element receiving member, and vibration reduction device in which three exemplary springs are shown for clarity.
Figure 8:
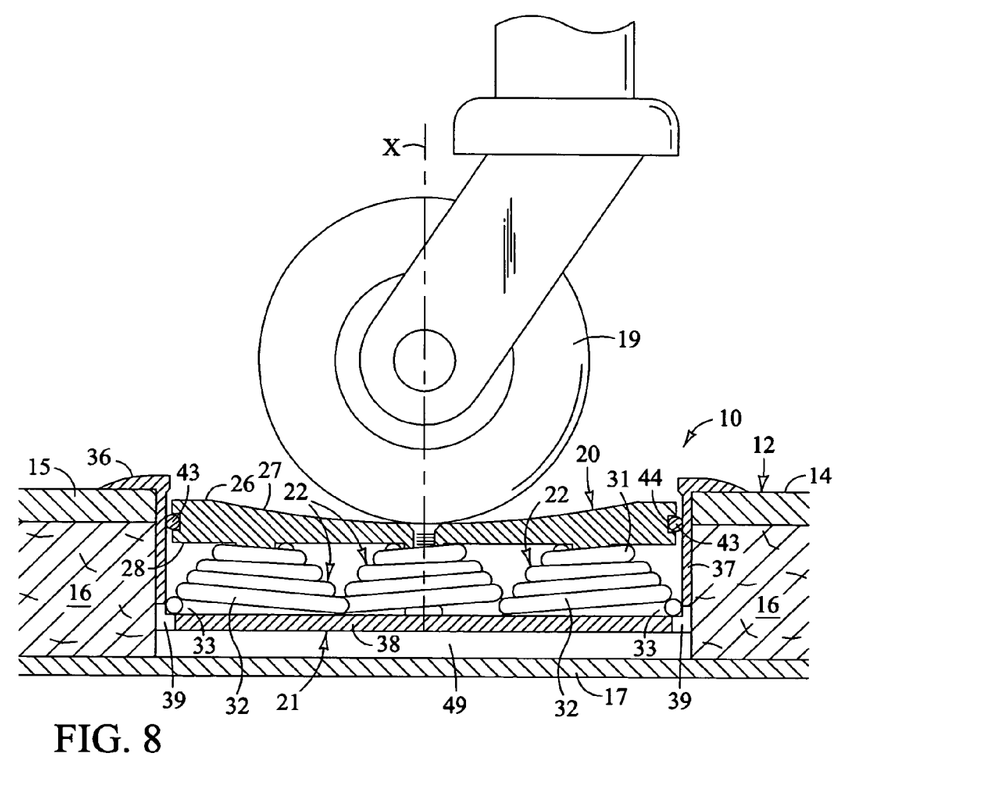
FIG. 8 is a view similar to FIG. 7 with a fragmentary showing of a stretcher leg and wheel as a load element bearing downwardly against the element receiving member, and deflecting the vibration reduction device.

FIGS. 1, 7, and 8, depict portions of an exemplary support element 12 as an ambulance floor 13. The floor 13 is shown to include a top surface 14 defined by a floor covering 15 that is supported on a sub floor 16 which can typically be formed of plywood. In many instances, the plywood will have a thickness dimension of about ¾ inch. The floor covering thickness can vary according to the material used, but can be within a range of about $1/16$-¼ inch. Thus the overall floor thickness (excluding the thickness dimension of a pan 17) can vary somewhat, but will generally be approximately $13/16$-1 inch. Other support elements, aside from the exemplary ambulance floor 13, can provide different thickness dimension range.

A bottom pan 17 that is mounted to or is an integral part of the ambulance chassis can typically support the ambulance subfloor 16. Ambulance floor pans 17 are usually formed of aluminum or another rigid material and is substantially imperforate, to protect the patient compartment. It is intended that certain embodiments of the present support 10 be configured for positioning between the floor 13 and the load element 18 without involving penetration or alteration of the pan 17 and without projecting significantly above the top floor surface 14.

Support Apparatus General Configurations

Figure 2:
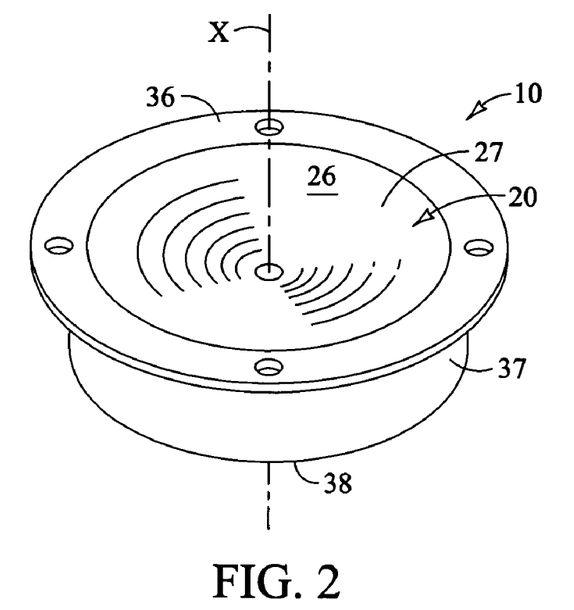
FIG. 2 is a pictorial view depicting an exemplary single support apparatus.
Figure 10:
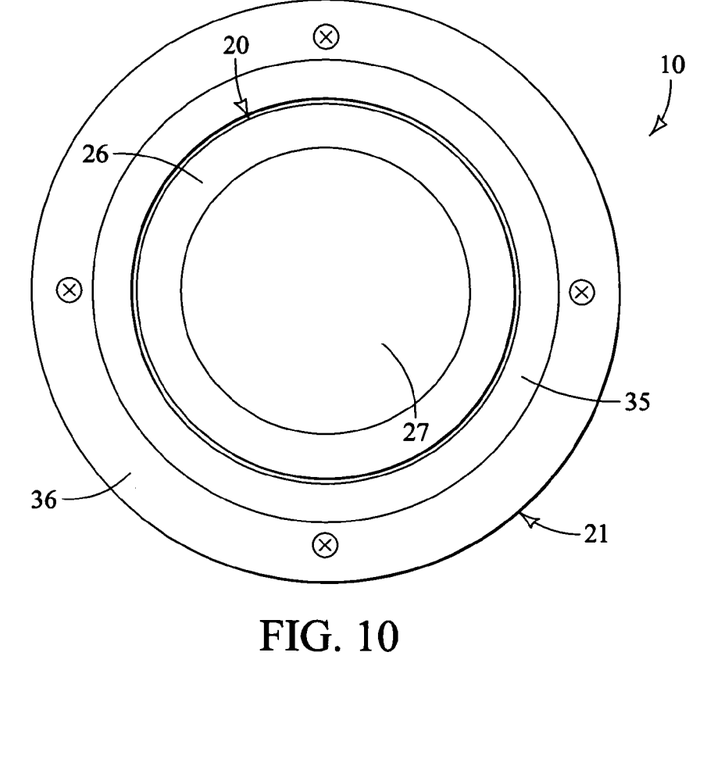
FIG. 10 is a top plan view of the support apparatus according to another embodiment of the invention.
Figure 11:
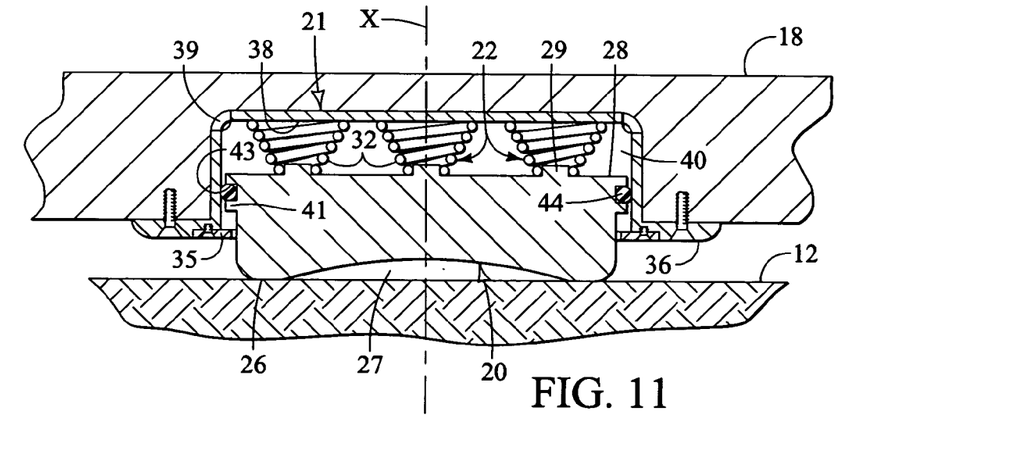
FIG. 11 is a sectional view of the FIG. 10 embodiment.
Figure 12:
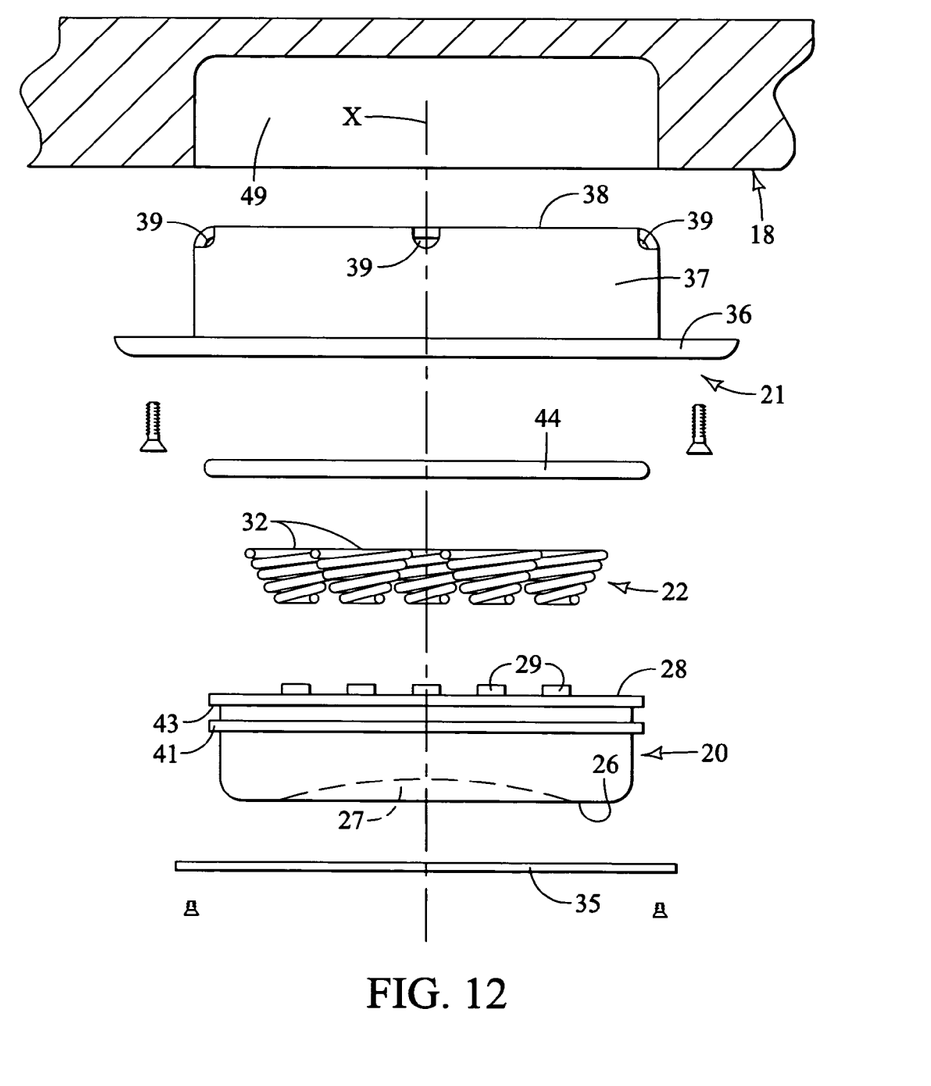
FIG. 12 is an exploded side elevation view of the FIG. 10 embodiment.
Figure 13:
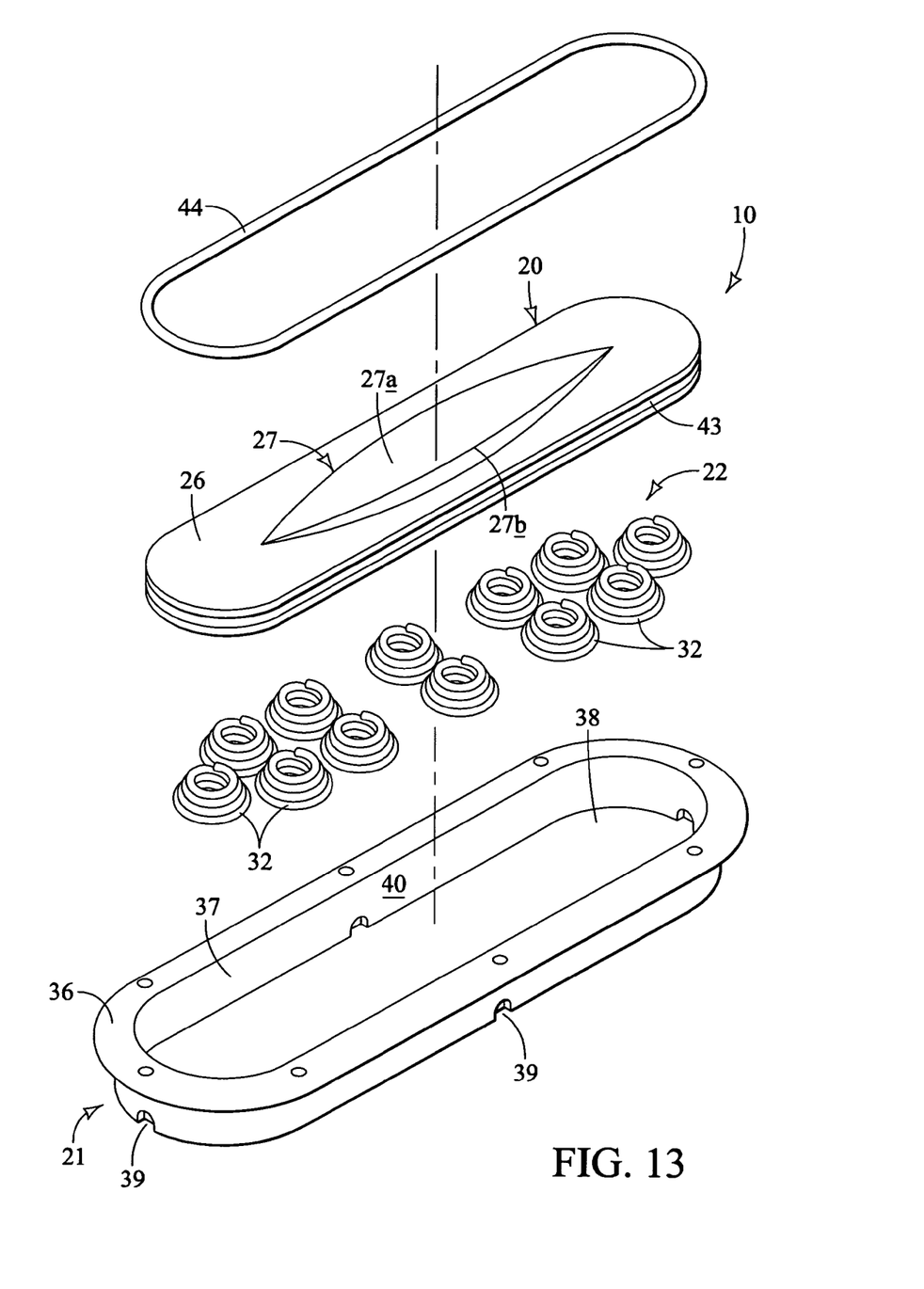
FIG. 13 is an exploded perspective view of a wheel chair support embodiment of the support apparatus.
Figure 14:
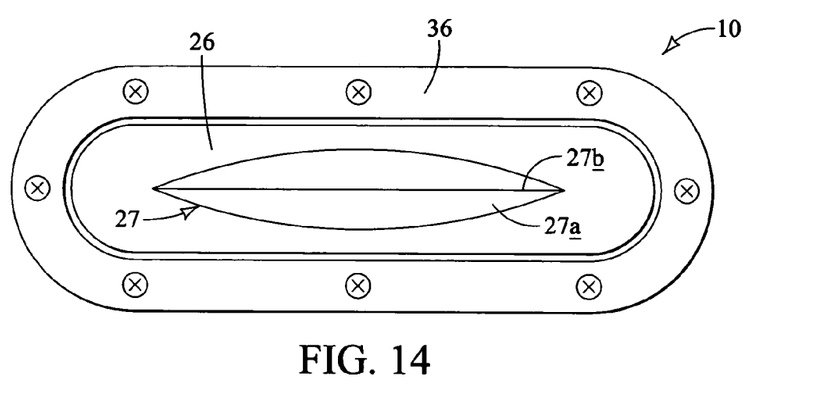
FIG. 14 is a top plan view of the FIG. 13 embodiment.
Figure 15:
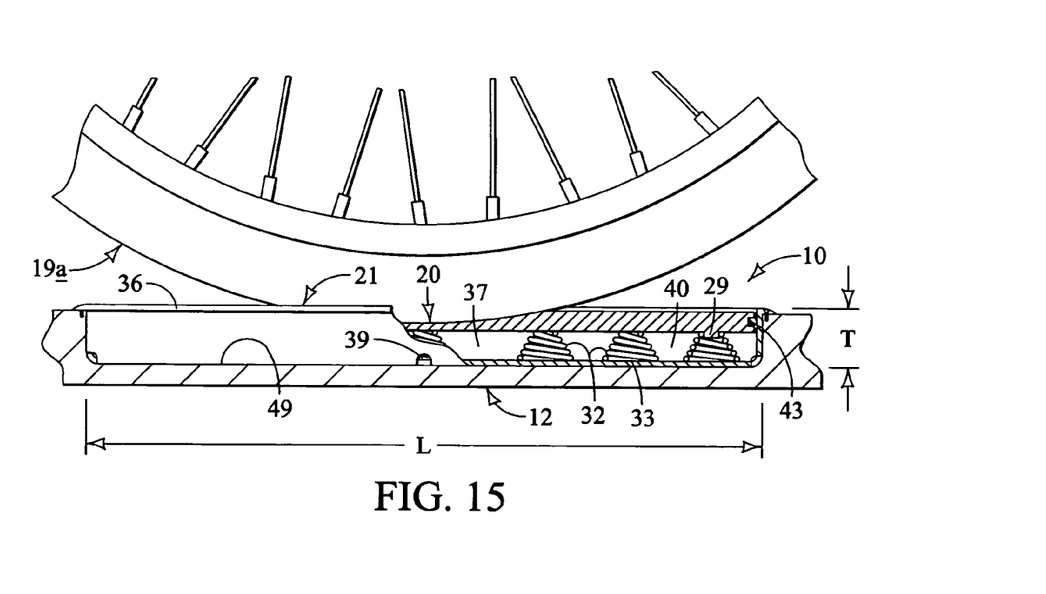
FIG. 15 is a partially sectioned view of the FIG. 13 embodiment, depicting a segment of a wheel chair as a load element resting against a support member.

It is noted that the support apparatus 10 is shown in FIG. 2 as circular in form, including an element receiving member 20 and a base member 21. This can also be true for other embodiments of the present apparatus 10 such as depicted by FIGS. 10-12. However, other shapes can be used, including curvilinear or polygonal shapes. One such alternative configuration is depicted in FIGS. 13-15, which show a curvilinear elongated embodiment.

It is pointed out that the present support apparatus 10 can be provided in a system in combination with a vehicle support element such as the floor depicted at 13, in FIG. 1, so as to receive and support each leg and wheel assembly 19 of a stretcher form of load element 18. Another embodiment of the support apparatus 10 can be mounted or likewise attached to a support element 12 as depicted in FIG. 15, to receive and reduce vibration from the support element 12 to the load element 18, depicted as a wheel chair wheel fragment 19a.

Other embodiments of support apparatus 10 can be produced for attachment singularly or in groups to a load element 18 as depicted in FIG. 12, for resting against a support element 12. The present support apparatus 10 can also be used in loose engagement between a load element 18 and a support element. 12.

The Element Receiving Members

The element receiving member 20 in any of the exemplary embodiments can be formed as a rigid plate of an appropriate material such as aluminum, which can be anodized for surface hardening and to avoid corrosion. Aspects of the receiving member 20 that are generally common to all embodiments include a top or outward surface 26 which as depicted in FIGS. 2, 7-9, and 13-5, can include a concave centering surface 27 formed therein.

The concave centering surface 27 can be substantially centered on a central axis "X" that passes through the element receiving member 20 and about which the remaining components of the support apparatus are spaced. The outward surface 26 can extend about the centering surface 27 and can be oriented substantially perpendicular to the axis "X".

The concave surface 27 can be of a substantially constant radius (i.e. spherical), as depicted in FIGS. 7 and 12. However, conical, pyramidal and other concave surface shapes can function as well. As an example, the embodiment exemplified by FIGS. 13-15 provides for a "V" shaped concave wheel chair wheel receiving surface 27a, forming an elongated, line 27b at the vertex of the "V" shape. The surface 27a and line 27b are at least substantially centered on the receiving member 20 and extend longitudinally with respect to the elongated configuration of the FIG. 7 embodiment.

In the embodiments depicted, a surface 28 is provided on member 20, opposite to the top or outward surface 26. Surface 28 can be provided with a number of axially protruding bosses 29 that can be used to position and spatially locate the vibration reduction device 22. In the illustrated embodiments, numerous bosses 29 are provided, with one or more centrally located and the remainder substantially equally spaced from the central axis "X". The bosses 29 can be integral with the element receiving members 20. Alternatively, the bosses can be separately formed and mechanically, adhesively, or otherwise attached to the receiving member 20.

While the bosses 29 depicted in FIG. 8 and others are part of the element receiving member 20, the base member 21 can alternately be provided with similar bosses for the same purpose of positioning the vibration reduction device 22. As a further alternative, another form of positioning arrangement such as formed sockets, tubular guides studs, or the like can be provided on either member 20, 21 or the vibration reduction device 22 for positioning the device 22 with respect to the element receiving member 20.

The axial distance between the top or outward surface of element receiving members 20 and the opposite surfaces 28 define a thickness dimension, which can vary from one embodiment to another. For example, the thickness dimension of the element receiving members 20 exemplified in FIGS. 7 and 13 can be substantially equal, while the thickness of member 20 for the embodiment depicted in FIGS. 10-12 can be greater for reasons set forth below.

FIGS. 7 and 15 embodiments of the element receiving members 20 can be made relatively thin, to minimize the overall thickness dimension of the apparatus 10 and to permit installation in or on thin floor support elements such as the ambulance floor 13 described above. Element receiving members 20 that are formed in this manner are well suited to use in installations where it is preferred that the outward or top surface 26 of the element receiving members 20 be in close proximity to the plane of the floor surface 14 of the support element 12. These embodiments can be used to advantage in applications in which the present support apparatus 10 are mounted to the support element 12, and the load element 18 has, for example, a wheel or leg support such as the illustrated stretcher leg assembly 19 (FIG. 1) or wheel chair 19a (FIG. 15). The legs or wheels can be readily rolled or otherwise moved onto the element receiving members 20 without requiring substantial lifting.

The FIG. 10-12 embodiment can be produced such that part of the somewhat axially elongated element receiving member 20 will always be exposed beyond the base member 21. The increased axial thickness allows for axial travel between the load element 18 and the support element 12 when arranged as suggested by FIG. 12. As such, this embodiment can be advantageously mounted to load elements 18 such as pallets, cargo containers or other load elements 18 that would otherwise rest in substantially flush engagement against the support element 12.

From the above, it can be understood that the present support apparatus 10 can be either mounted to a support element 12, or to a load element 18. It follows then that, depending upon the embodiment; the element receiving member 20 can be made to engage directly with the load element 18 (FIGS. 8 and 15) or the support element (FIG. 12).

Referring now to the examples illustrated in FIGS. 7, 12, and 13, embodiments of the apparatus 10 can include peripheral grooves 43 or equivalent structure that can be configured to mount a sliding seal, which can be in the form of an "O" ring 44. The illustrated groove 43 can be sized to locate the "O" ring 44 in sliding engagement with an adjacent wall 37 of the associated base member 21.

The "O" rings 44 can be of a conventional form to provide a sliding but resilient seal between the element receiving members 20 and the base members 21. The "O" rings 44 can be formed of rubber or an appropriate synthetic "O" ring material that includes resilient properties. An exemplary "O" ring material will deflect to conform with the shape of the adjacent engaged surfaces and will movably seal the element receiving member 20 against the base 21 to prevent liquids and debris from entering a chamber 40 that formed by the associated base member 21.

Resilient "O" rings 44 also allow for resilient lateral deflection of the receiving members 20 with respect to the base members 21. Lateral vibration (with respect to axis "X") can thus be reduced between the base members 21 and receiving members 20. Further, the resilient "O" rings 44 can allow a degree of lateral deflection without permitting a binding engagement of the two members 20, 21 upon axial deflection of the element receiving members 20 under load.

While the "O" rings 44 of the various embodiments are depicted as being mounted on the element receiving members 20, the base members 20 can also be provided with appropriate mounting surfaces for an "O" ring arrangement that can be made to function in a similar manner to the "O" ring arrangements illustrated and described above.

In certain embodiments, the element receiving members 20 can be provided with a normally plugged lift hole 46 (FIG. 9) to allow for attachment of a lift tool 47. Tool 47 can be used for placing and removing the associated load engaging member 20 into and from the base 21. An appropriate plug or screw (not shown) can be used to normally close the hole 46.

The Base Member

Figure 9:
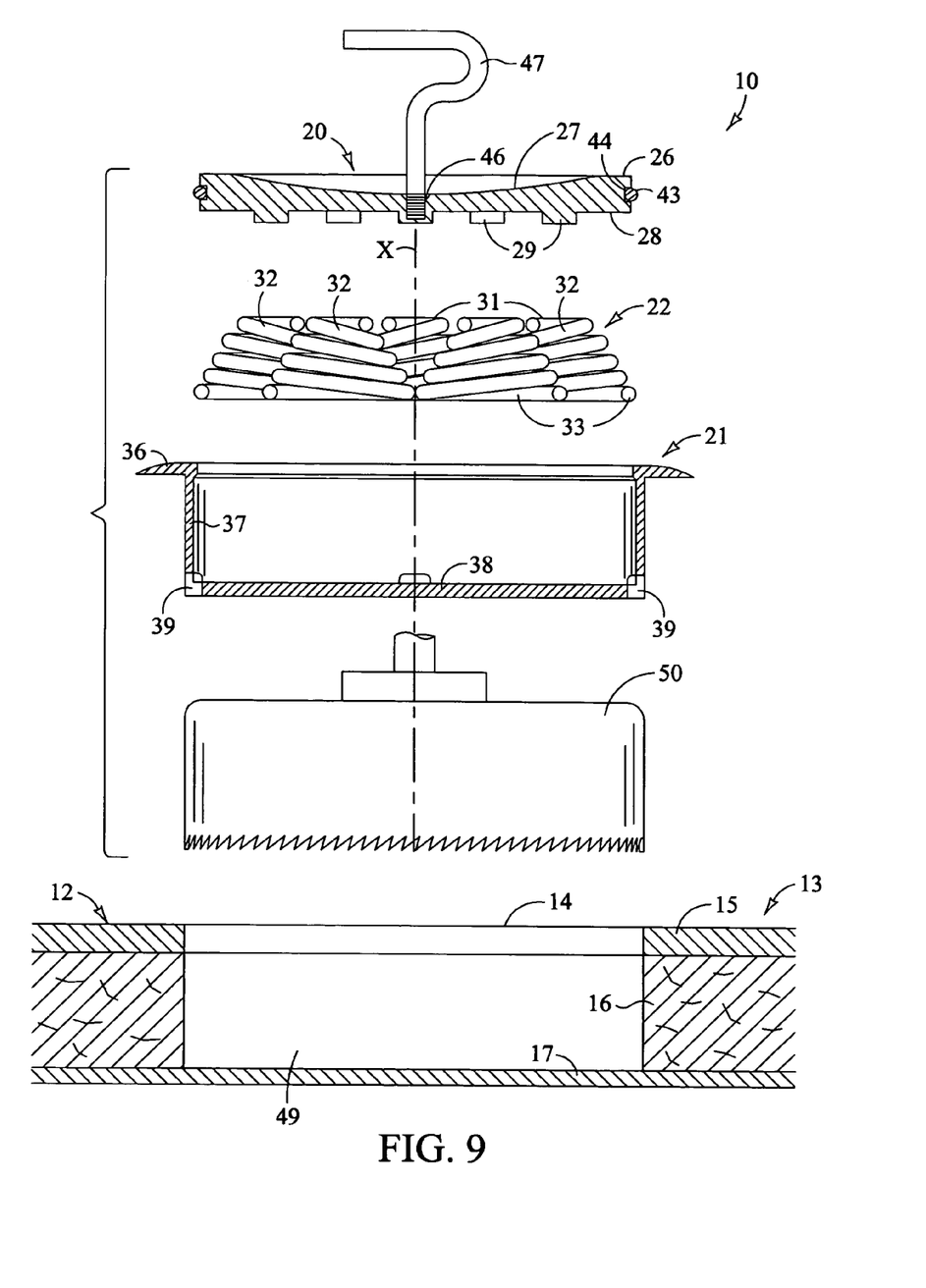
FIG. 9 is an exploded view depicting components in a separated arrangement and indicating steps in a process for reducing vibration between a support element and a load element.

Referring now in greater detail to the embodiments of the base members 21, attention is drawn to FIGS. 9, 12, and 13 where various base member configurations are shown without the element receiving members 20 and vibration reduction devices 22. As depicted, the base members 21 can be somewhat bowl or pot shaped to slidably receive the associated element receiving members 20 and to house the vibration reduction devices 22.

In FIGS. 9 and 15, the base members 21 are shown mounted to an associated support element 12. In FIG. 12, the illustrated base member 21 is shown mounted to an associated load element 18.

The base members 21 can be formed of the same material, such as anodized aluminum, as the receiving members 20, and can be produced using conventional milling, casting or other known manufacturing techniques.

Each exemplary base member 21 can include a flange 36 that can be used to secure mounting of the apparatus 10 to a support element 12 (FIGS. 7, 15) or a load element 18 (FIG. 12). Flange 36 can be formed with a beveled outward edge that will smoothly transition with an adjacent surface of the element 12 or 18 to which the base member 21 is mounted. In the embodiments depicted in FIGS. 7 and 15 the illustrated flanges 36 are substantially flush with a support 12 such as an ambulance or other vehicle floor, while the flange 36 depicted in FIG. 12 is shown mounted to a load element 18 such as a pallet, cargo container, box or the like.

In the FIGS. 7 and 15 configurations, no more than the axial thickness of the flange 36 is depicted as being exposed beyond the adjacent surface of the support element 12. This can be done to reduce obstruction to wheel access by a stretcher leg or wheel assembly 19, a wheel chair 19a, or another support engaging surface of an associated load element 18. The low profile also serves to avoid any significant change in the "at rest" position of the load member 18 so no change or modification of, say, ambulance stretcher lock down equipment (not shown) will become necessary.

It is pointed out that no flange 36 is necessary in variations wherein the present apparatus 10 is used without attachment to a support element 12 or to a load element 18. Further, even support apparatus 10 with mounting flanges 36 can be loosely mounted between loads and supports without seriously affecting the ability of the apparatus to reduce transmission of vibration.

Each of the exemplary flanges 36 can be situated at or adjacent to the top end of a base side wall 37. The base side walls 37 can be formed substantially continuously about the axis "X" and can be of a generally cylindrical configuration (FIGS. 2, 10) or another shape such as the elongated configuration illustrated in FIGS. 13-15, in complimentary relation to the associated element receiving members 20.

The base wall 37 can extend axially from the flange 36 toward an end wall 38. In various embodiments, the base walls 37 and associated end walls 38 together can be formed to define chambers 40 (see for example FIGS. 12 and 15) that contain the vibration reduction device 22. The end wall surfaces 38 can be used to help contain and provide reaction surfaces against which the vibration reduction devices 22 can operate.

Versions of the base member 21 that can be used in retrofit situations (mounted to pre-existing support or load elements 12, 18) can include the end walls 38. In such embodiments, breather holes 39 (FIG. 15) can be provided to reduce air pressure fluctuations within the chamber 40.

It is noted that the depicted end walls 38 (and the remainder of the base members for that matter) can be eliminated in situations where the support apparatus 10 is incorporated as an integral part of a support element 12 or a load element 18. In such instances, the element 12, or 18 itself can become the base member 21 and include integral surfaces that define base and end walls.

It is generally advantageous to minimize the overall thickness dimension of the apparatus 10 to permit installation in confined spaces and provide lateral stability. Thus, in one example, the axial dimension "T" (FIG. 15) of the base walls 37 between flanges 36 and end walls 38 can be under two inches and for ambulance and similar vehicle floor installations, about one inch or even less. This minimal overall axial thickness dimension "T" as compared with the significantly greater lateral dimension "L" also contributes to lateral stability especially in the FIG. 10-12 embodiment by minimizing the axial working distance between the load 18 and support 12 and maximizing the effective lateral "footprint" of the apparatus 10.

In the illustrated embodiments, the present apparatus 10 can be made with base thickness dimensions to approximate an anticipated thickness dimension of the element to which the apparatus is to be mounted. In one example, the base thickness dimension can be made to accommodate a support element 12 such as a conventional ambulance floor, including the floor covering and the sub floor, but not the pan thickness dimension (see FIG. 7 or 15). In another example, the base thickness dimension can be made to accommodate a load element 18 such as a pallet, cargo container, box, or equivalent structure as exemplified by FIG. 10.

The Vibration Reduction Device

Aspects of the vibration reduction device 22 will now be discussed. In general terms, the vibration reduction device 22 is provided between the base member 21 and element receiving member 20. For example, a stretcher leg and wheel 19 (FIG. 8) or a wheel chair 19a (FIG. 15), or a pallet, box, cargo container, or other load element 18 (FIG. 12) can be releasably supported on or by the element receiving member 20 and the vibration reduction device 22 will reduce transfer of vibration from the support element 12 to the load element 18.

Various known pneumatic, hydraulic, or mechanical devices can be used along with the support 20 and base 21 to achieve the desired vibration damping result within the scope of our invention. However it is useful to employ springs and more specifically, a plurality of conical coil compression springs 32 that can be formed of conventional spring material, having top ends 31 of reduced diameter with respect to enlarged bottom ends 33. Multiple springs 32 of the nature exemplified herein give the advantage of simplicity, adjustability, low cost, and uniform resistance against forces applied axially by the associated support element 12. Transmission of small lateral vibrations can also be reduced as accommodated by the springs and inherent resiliency of the "O" rings 44.

The illustrated spring tops 31 can be shaped to receive the bosses 29 on the adjacent element receiving members 20. This is a desirable arrangement by which the springs can be evenly and equally placed about the central axis "X", thereby providing for uniform resistance against axial movement of the associated element receiving member 20. It is again noted, however, that other spring orientation arrangements can be made that are not shown but that fall within the scope of this application.

It is also pointed out that the spring travel can be limited to an axial distance of less than about 0.75 inches. Low profile and short spring travel permit use of the present support apparatus 10 without presenting significant obstruction to reception and transport of a load. Further, short spring travel can be desired because it permits reduction of vibration without requiring alteration or replacement of the structure to which the apparatus 10 is mounted. A stretcher, for example, can be carried on the ambulance floor at very nearly the same elevation as the stretcher would be carried on the floor without the present support assemblies 10. Minimal deflection of the element receiving members 20 is also such that existing stretcher lock down mechanisms provided for in the associated ambulance can be used in the same manner as they would be if the present support apparatus 10 were not being used.

Figure 3:
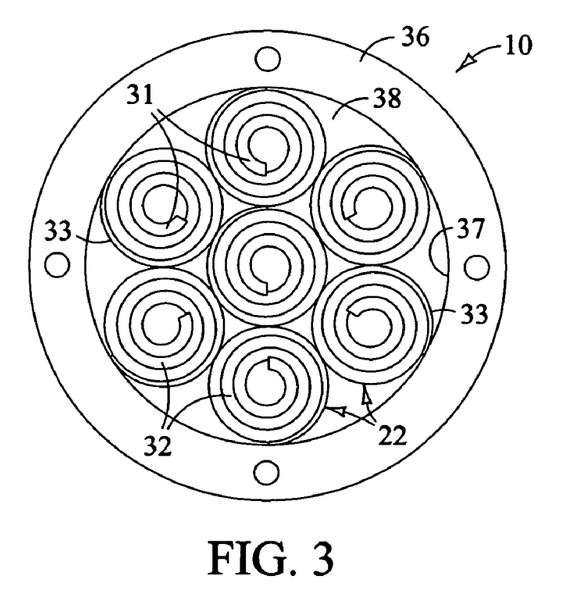
FIG. 3 is a top plan view of the support apparatus embodiment exemplified by FIG. 2 with the element receiving member removed, and showing a vibration reduction device component of the support apparatus adjusted for a high degree of resistance to deflection.

FIG. 3 depicts seven springs 32 in use within a base member 21. Although seven individual springs 32 are illustrated, it should be understood that greater or fewer numbers can be used. In fact, an arrangement of up to twelve springs 32 (FIG. 13) or even more can be used in situations where greater spring resistance is desired. Fewer springs 32 can also be used, with different spacing arrangements. Typically, however, a minimum of three (to allow for adjustment), and a maximum of up to twelve or more springs can be used, depending upon the application and load to be carried.

It is further pointed out that the springs can be secured to the base member 21, the element receiving member 20, or be independent and removable as depicted. In the illustrated embodiments, the springs are relatively independent, being confined laterally only by the bosses 29, and axially removable simply by removal of the associated element receiving member 20. It is a simple matter to access the springs to change resistance by adding to or removing springs from the groups presently held within the base members 21.

Figure 4:
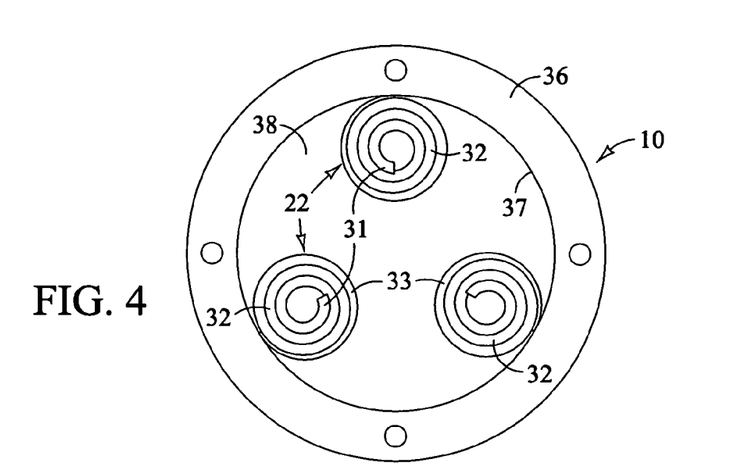
FIG. 4 is a top plan view of the FIG. 2 embodiment depicting another exemplary arrangement of the vibration reduction device for a lesser degree of resistance.
Figure 5:
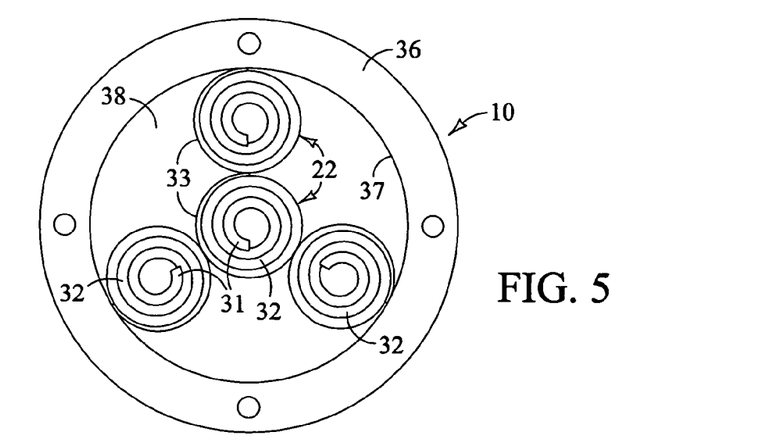
FIG. 5 is a top plan view depicting another exemplary arrangement for the vibration reduction device.
Figure 6:
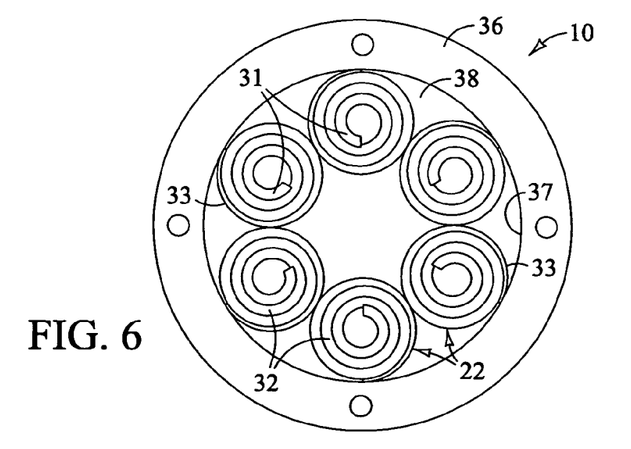
FIG. 6 depicts another exemplary arrangement used to produce a still further different degree of resistance.

FIGS. 4-6 are included to depict arrangements of springs 32 used to vary the amount of resistance offered to axial movement of the element receiving member 20. Such adjustment capability can be used to accommodate weight distribution for different loading situations. In the ambulance and stretcher example, weight concentration under a prone patient can vary with more weight concentrated at the torso area than at the head or feet. Adjustment of spring numbers below the different weight concentration areas can be made accordingly. For example, the base members 21 that are located under the torso area of a patient can be fitted with a maximum number of springs 32, while those base members 21 situated below the head and feet can be supplied with fewer springs.

Adjustment of spring numbers can also be made in instances where transport conditions are known. For example, more springs might be used in a vehicle such as an ambulance that is dedicated to use in a professional football stadium because potential patients are likely to be heavier than those found in ordinary public places. Likewise, in exemplary settings, loading can be predicted according to the product to be carried. A pallet of fine china, for example, can have a predictable weight, and the number of springs in pallet or carrier mounted support assemblies 10 can be adjusted accordingly. A significantly different number of springs might be selected to reduce transmission of vibration to, say, a similar pallet of fragile Christmas ornaments.

Travel medium can also influence adjustment of spring count. For example, different spring counts might be employed in a carrier vehicle that is typically used on bumpy unpaved roads as opposed to the same carrier vehicle and the same load carried over a smooth paved surface.

Embodiments illustrated in FIGS. 4, 7, and 8 depict an equiangularly spaced group of three springs 32, an arrangement used to minimize resistance to axial deflection of the element receiving member 20 in the illustrated circular forms of the present apparatus 10. FIGS. 5 and 6 depict example arrangements for progressively increasing resistance by using more springs 32. The illustrated exemplary springs are also in equiangular relationships with respect to the central axis "X". Of course the heaviest resistance is offered by the maximum number of springs 32 (assuming the same spring constant is used for additional springs) that will fit into the base 21 (FIG. 3), which in the example illustrated is seven. A base member 21 of larger size (see the elongated wheel chair receiving embodiment of FIG. 13) can receive even more springs 32, which can be arranged in clusters as shown. The groupings shown are offered simply as examples for spring grouping based upon an initial spring outlay.

It has been found by experimentation that slight unequal angular spacing of springs about the center axis "X" is tolerable, so long as the element receiving member 20 does not deflect and bind from asymmetrical loading. For example two of the springs (the center spring and one of the remaining springs) have been removed from the otherwise symmetrical arrangement shown in FIG. 3, thereby leaving an asymmetrical arrangement of springs. It was found that such an arrangement did not result in a noticeable imbalance in resistance or binding of the element receiving member under loading conditions. This capability can be attributed to the concave centering surfaces 27, 27a, and the resilient nature of the "O" rings 43.

Spring arrangements in the examples illustrated in the wheel chair embodiment of FIG. 13 can be adapted to the elongated nature of the element receiving member 20 and base member 21. Functioning of the springs, however will remain consistent with those provided in the versions shown in FIGS. 4-6 and others.

Other Considerations

In the embodiments illustrated by FIGS. 10-12, an additional part can be provided to discourage separation of the members 20, 21. A retention device such as a retainer ring 35 or another appropriate stop can be mounted on the base member 21 in the axial path of an "O" ring mounting flange 41 on the receiving member 20. The retainer 35 can be provided in the form of a ring that can be releasably attached to the base to allow for removal of the associated element receiving member 20 for spring count adjustment or other purposes, but will normally act to prevent the element receiving member 20 from falling.

Retainers 35 are not required in other embodiments where the element receiving members 20 face upwardly. However, retainer rings 35 become useful in embodiments where the base members 21 are mounted to a load element 18 as suggested in FIG. 11, and the element receiving members 20 can be in a downwardly oriented position. Thus, when the load element 18 (such as a cargo container, pallet or the like) is lifted, the receiving members 20 can slide to extended positions but will be held from falling by the retainers 35.

Process and Operation

To reduce transmission of vibration from a support element 12 to a load element 18, an initial step can include embedding or otherwise positioning the base member 21 in one of the support or load elements 12, 18. This can be done by forming the base member as an integral part of the selected support or load element, or by mounting the described base member 21 to the chosen element 12 or 18.

To secure a base member 21 in a retrofit arrangement to one of the support or load elements 12, 18, an appropriate device such as a hole drill, router, or other material removal tool can be used for forming a socket 49 of a shape complimentary to the base member 21. In the ambulance floor example illustrated, the socket 49 is formed to a depth that is equal to or slightly greater than the thickness dimension of the base 21 (as measured from the bottom surface of the flange 36 to the bottom wall 38 of the base member 21). A hole saw 50 is illustrated in FIG. 9 as one exemplary tool for accomplishing this task.

Once the socket 49 is provided or otherwise formed, the complimentary shaped base member 21 can be inserted, with the mounting flange 36 coming into contact with the element surface. Appropriate fasteners such as screws, bolts, adhesive, or other fasteners can be used at this point to secure the base member in position. Alternatively the socket size can be selected to provide a resistance fit so mechanical or other fastening means is not required.

Placing the vibration reduction device 22 now becomes a simple matter of selecting a desired number of springs 32 and arranging them in a desired spatial grouping before inserting the receiving member 20. This can be accomplished using the bosses 29 as placement guides, and choosing the number and placement of springs according to the nature of the load to be carried.

In embodiments such as illustrated by FIGS. 1 and 15, the element receiving member 20 will face upwardly and can be installed simply by lowering it into place and pressing the attached "O" ring 44 into sliding engagement with the complimentary side walls 37 of the associated base member 21.

The springs 32 will hold the element receiving member 20 in position, ready to receive a load.

In embodiments where a retainer 35 is used (FIGS. 10-12), another step can be that of securing the retainer 35 after sliding the element receiving member 20 into place. The retainer 35, once secured, will function to prevent the element receiving member 20 from falling free of the base member 21.

The above steps can be repeated for each support assembly 10 to be used, with variations required only when the number and placement of springs 32 are to be altered according to a particular loading situation.

Continued description of the operation and process will be made with reference to the ambulance and stretcher illustrations. Other embodiments involve similar operation or procedural steps unless noted otherwise.

After installation and adjustment of the vibration reduction devices 22, the process can continue with placement of the stretcher load element 18 on the ambulance floor with legs and wheels 19 resting on the element receiving members 20. Transmission of vibration from the ambulance floor support element 12 to the stretcher will be reduced by the resilient properties of he springs 32.

The installed support apparatus 10 can have flanges 36 and receiving members 20 substantially flush with the ambulance floor as shown in FIG. 7, in position to receive all of the floor engaging legs or wheels on the associated stretcher. However, when a stretcher is rolled into place and locked down, with the stretcher legs or wheels 19 engaging the support apparatus 10, the stretcher and patient weight will deflect the receiving members 20 as suggested in FIG. 8. During such deflection, the element receiving members 20 will slide axially within the base members 21 while the "O" rings 44 maintain resilient yet sealed relationships with the base members 21. Any air that might otherwise be compressed within the associated base members by the above action is expelled through the air drain holes 39. Also the concave surfaces 27 on the element receiving members 20 serve at this time to center the applied weight over the respective groups of springs 32.

As the conical compression springs 32 compress, their windings will nest axially together, allowing for maximum spring travel in the minimal space allowed. Of course the amount of deflection depends upon the weight bearing down from the load created by the patient and stretcher.

All the time the load element 18 is in place, relatively small amount of spring travel will assure that, in the ambulance application, stretcher lock down mechanisms (not shown) will function normally. Thus no alteration of the lock down mechanism is required. Further, in situations other than the ambulance and stretcher scenario, the low profile apparatus 10 will also permit loading and unloading of load elements 18 in a fashion very similar to loading and unloading steps without the apparatus 10 in place.

Should a need arise for adjustments in spring resistance, or a need otherwise arises to gain access to the springs, a user can simply engage a lift tool 47 (FIG. 9) with the selected element receiving member 20 and lift it from the base member 21 to expose the springs 32. One or more springs 32 can be removed, adjusted spatially, or added to achieve the desired effect. Replacement of the element receiving member 20 is accomplished simply by reversing the removal step.

Loading of the embodiment illustrated in FIGS. 13-15 can occur in a manner similar to that for the embodiment described above, except that it may be that only two of the support apparatus 10 need be provided. One apparatus 10 for each of the rear wheel of a wheel chair 19a is typically sufficient. The elongated base members 21 can be mounted to the vehicle support element 12 (typically a floor at least somewhat like the ambulance floor). The elongated base members 21 can be installed in parallel relation and be spaced apart by a distance equal to the distance between the rear wheels of the wheel chair 19a to be received. The "V" shaped concave centering wheel chair wheel receiving surfaces 27a are thus positioned to receive, center and secure the wheel chair wheels as the chair 19a is rolled onto the receiving members 20. Transmission of vibration from the vehicle support element 12 to the load element 18 (the wheel chair 19a) will be reduced in the same manner as described above.

Loading of the embodiment illustrated in FIGS. 10-12 can occur in a manner as already described, except that the base member 21 is mounted to the load element 18 and a retainer 35 is provided to hold the element receiving member 20 in place. Thus to gain access to insert, remove, or adjust spacing of springs 32, the retainer 35 can first be removed or otherwise displaced in order to allow the receiving member 20 to slide from engagement with the base member 21 and thereby permit access to the springs 32 therein.

Operation of the FIG. 10-12 embodiment is essentially the same as for the other embodiments except that the load element 18 carries the support apparatus 10 and each receiving member 20 comes into contact with and deflects axially as the load is lowered toward the support element 12. The increased axial thickness of the receiving member 20 in this form is provided so that the outward surface 26 will normally project beyond the base member 21 to engage and axially deflect on engagement with the support element 12. The partially deflected springs will then act to reduce transmission of vibration transmission between the support element 12 and the load element 18 in substantially the same manner as described for the other embodiments.

While the above methods and apparatus have been described in language more or less specific as to structural and methodical features, it is to be understood, however, that the invention is not limited to the specific features shown and described since the means herein disclosed comprise the preferred forms of putting the invention into effect. The invention is, therefore, claimed in any of its forms or modifications within the proper scope of the appended claims as appropriately interpreted in accordance with prevailing rules of interpretation.

Characterization

The following "characterizations" are to be considered as part of the "Detailed Description", and are to be further considered as selected generic embodiments of the correspondingly identified exemplary embodiments. While a "characterization" of an embodiment may be described below with reference to a specific exemplary embodiment, the referenced exemplary embodiment should not be considered as limiting the scope of the corresponding "characterization". Further, the "characterizations" set forth below should not be considered as limiting the scope of the current claims, or any future claims to be presented in any continuation, divisional, reissue, or reexamination patent application following from the current application.

A load element support apparatus (as exemplarily embodied by the apparatus in FIGS. 1-9 and 13-15 of the drawings included herewith and the entire accompanying description, without limitation).

A load element support apparatus for use with a vehicle having a floor with a top floor surface, comprising:

a load element receiving member defining a concave element receiving surface adapted to releasably receive at least a portion of the load element;

a base member configured to be mounted to the vehicle floor and to mount the load element receiving member for movement between a position substantially coplanar with the top floor surface, and a position below the top floor surface;

a vibration reduction device mounted between the base and the load element receiving member, and wherein the at least a portion of the load element can be releasably supported on the load element receiving member, and the vibration reduction device is configured to reduce transfer of vibration from the vehicle floor to the load element to be supported.

The element support apparatus described immediately above, further comprising a resilient "O" ring on one of the members and in wiping engagement with the other one of the members.

The element support apparatus described first above, wherein the members are elongated and the concave element receiving surface is elongated and formed in an elongated "V" configuration to receive and center wheel chair wheels.

The element support apparatus described first above, wherein the members are relatively moveable along an axis, and wherein the members define a thickness dimension along the axis that is under two inches.

The element support apparatus described first above wherein the members are movable relative to one another along an axis, and wherein the vibration reduction device is comprised of up to twelve conical compression springs removably placed between the members for axial deflection along the axis.

A process for reducing transmission of vibration from a support element to a load element (as exemplarily embodied by all drawings and the entire accompanying description, without limitation).

A process for reducing transmission of vibration from a support element to a load element, comprising:

providing a base member;

mounting a element receiving member on the base member;

confining the members to movement toward one another along an axis;

placing a plurality of conical compression springs between the members to supply yieldable resistance to axial movement of the members along the axis toward one another; and positioning a resilient "O" ring between the members to guide axial movement of the members and yieldably resist lateral movement of the members with respect to the axis.

A load element support apparatus (as exemplarily embodied by the apparatus in all drawings included herewith and the entire accompanying description, without limitation).

A load element support apparatus for use between a load element and a support element, comprising:

an element receiving member adapted to engage against one of the elements;

a base member mounting the element receiving member for movement along an axis and adapted to engage against the other one of the elements with the axis oriented substantially vertically;

a plurality of compression springs releasably mounted between the members and disposed about the axis to yieldably resist axial motion of the members toward one another; and wherein the element receiving member, base member and compression springs are configured to be placed between the load element and support element in such a manner that transmission of vibration from the support element to the load element is reduced by deflection of the compression springs along the axis.

We claim:

1. A support apparatus that can be positioned between a load element and a support element to cushion the load element against vibration with respect to the support element, comprising, a receiving member;

a base member movably mounting the receiving member along an axis of movement;

an element engaging surface defined on one of the base member or the receiving member and in substantially normal relation to the axis, and wherein the element engaging surface includes a concave wheel receiving recess;

said element engaging surface being configured to releasably engage one of the elements;

wherein one of the base member or the receiving member is partially received within the other member for sliding motion along the axis; and a vibration reduction device mounted between the base member and the receiving member and configured to yieldably resist relative movement of the members toward one another.

2. The support apparatus of claim 1, further comprising a sliding seal between the base member and the receiving member extending about the vibration reduction device and configured to permit axial relative movement of the members and limited lateral movement.

3. The support apparatus of claim 1, wherein one of the base member or the receiving member includes a formed chamber for slidably receiving the other member and wherein the other member is slidably received within and projects axially outward from the one member.

4. The support apparatus of claim 1, wherein:

one of the base member or the receiving member defines a chamber configured to slidably receive the other member;

the other member is slidably received within the chamber of the one member; and further comprising, a resilient "O"-ring disposed between the members to slidably seal the chamber.

5. The support apparatus of claim 1, wherein the vibration reduction device is comprised of at least three coil springs mounted between the receiving member and the base member.

6. The support apparatus of claim 1, wherein the base member includes a mounting flange and wherein a portion of the base member projects to one side of the mounting flange and is configured for reception within a complimentary socket formed in one of the load element or the support element.

* * * * *